(12) United States Patent
Whittenberger et al.

(10) Patent No.: US 8,721,973 B2
(45) Date of Patent: May 13, 2014

(54) STACKABLE STRUCTURAL REACTORS

(75) Inventors: William A. Whittenberger, Leavittsburg, OH (US); Gordon W. Brunson, Chagrin Falls, OH (US); Brian L. Davis, Ravenna, OH (US); Todd A. Romesberg, Vienna, OH (US); Randall J. Bartos, Ravenna, OH (US); Joseph W. Whittenberger, Ravenna, OH (US)

(73) Assignee: Catacel Corp., Garrettsville, OH (US)

( * ) Notice: Subject to any disclaimer, the term of this patent is extended or adjusted under 35 U.S.C. 154(b) by 205 days.

(21) Appl. No.: 13/359,957

(22) Filed: Jan. 27, 2012

(65) Prior Publication Data
US 2012/0195801 A1  Aug. 2, 2012

Related U.S. Application Data

(60) Provisional application No. 61/437,103, filed on Jan. 28, 2011.

(51) Int. Cl.
*B01J 19/00* (2006.01)
*B01J 8/00* (2006.01)

(52) U.S. Cl.
USPC .......................................... 422/129; 422/187

(58) Field of Classification Search
USPC .................................................. 422/129, 187
See application file for complete search history.

(56) References Cited

U.S. PATENT DOCUMENTS

| 4,292,055 | A | * | 9/1981 | De Castella et al. ............ 96/118 |
|---|---|---|---|---|
| 6,334,769 | B1 | | 1/2002 | Retallick et al. |
| 6,544,310 | B2 | * | 4/2003 | Badeau et al. ............... 55/385.3 |
| 6,920,920 | B2 | | 7/2005 | Whittenberger |
| 7,077,999 | B2 | | 7/2006 | Whittenberger |
| 7,090,487 | B2 | | 8/2006 | Whittenberger |
| 7,150,099 | B2 | | 12/2006 | Whittenberger et al. |
| 7,320,778 | B2 | | 1/2008 | Whittenberger |
| 7,472,936 | B2 | | 1/2009 | Whittenberger et al. |
| 7,501,102 | B2 | | 3/2009 | Whittenberger et al. |
| 7,565,743 | B2 | | 7/2009 | Whittenberger et al. |
| 7,566,487 | B2 | | 7/2009 | Feinstein |
| 7,591,301 | B2 | | 9/2009 | Whittenberger |
| 7,594,326 | B2 | | 9/2009 | Whittenberger |
| 7,682,580 | B2 | | 3/2010 | Whittenberger et al. |
| 7,906,079 | B2 | | 3/2011 | Whittenberger et al. |
| 8,047,272 | B2 | | 11/2011 | Whittenberger et al. |
| 2006/0230613 | A1 | | 10/2006 | Whittenberger et al. |
| 2011/0131786 | A1 | | 6/2011 | Whittenberger et al. |

OTHER PUBLICATIONS

International Search Report issued in International Patent Application No. PCT/US2012/022888.

* cited by examiner

Primary Examiner — Natasha Young
(74) Attorney, Agent, or Firm — Pearne & Gordon LLP

(57) ABSTRACT

A reactor for carrying out catalytic reactions. The reactor includes a reactor component optionally arranged on a central rod in a reactor tube. The reactor component can have fluid ducts for directing fluid flow through the reactor. The fluid ducts are effective for increasing heat transfer in the reactor. The reactor component can further have a washer attached to a top or bottom surface for directing fluid flow.

23 Claims, 10 Drawing Sheets

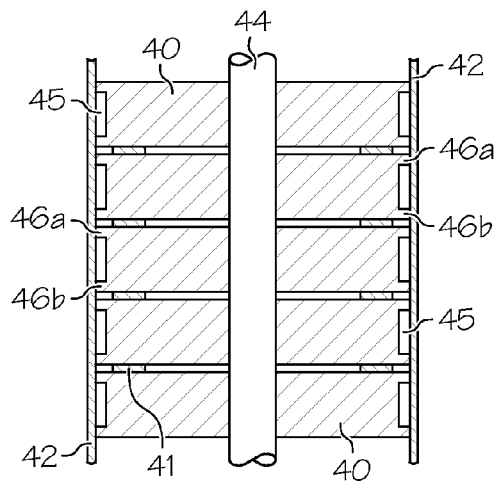
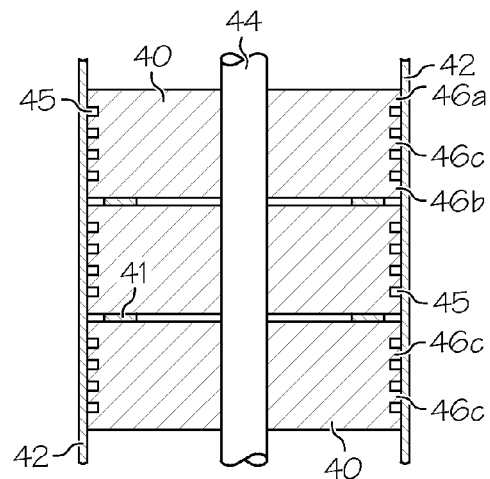
FIG. 15A
FIG. 15B
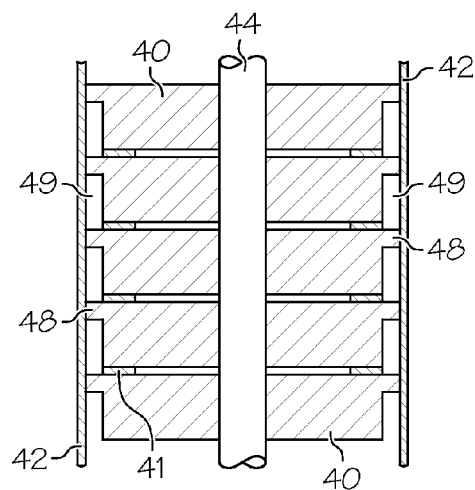
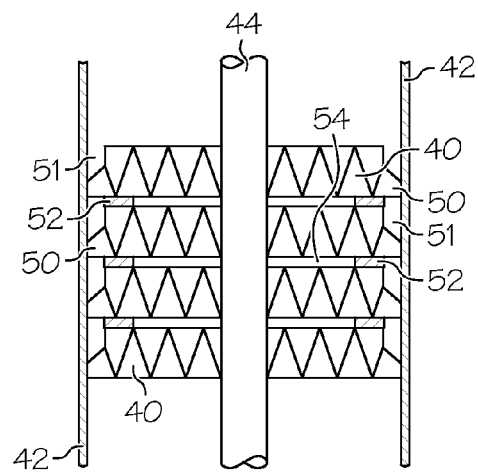
FIG. 16
FIG. 17

STACKABLE STRUCTURAL REACTORS

This application claims the benefit of U.S. Provisional Application No. 61/437,103, filed Jan. 28, 2011, which is incorporated herein by reference in its entirety.

FIELD

The present inventions relate to improved stackable structural reactors having increased efficiency and productivity, and in particular, improved stackable structural reactors having component arrangements for increased heat transfer and reaction efficiency.

BACKGROUND

Reformers, such as those used to produce hydrogen, generally contain reactor tubes exposed to a heat source, for example a furnace, to support endothermic reactions. Other types of reactions, such an exothermic, can require exposure to a cooling source, such as a cooling jacket. Reactor tubes can be loaded with ceramic pellets impregnated with catalyst or having a catalyst coating for carrying out a reaction. The ceramic pellets break and become damaged over time and can form a powder in the reactor tubes, which can undesirably clog gas flow in the reactor tubes and negatively affect heat transfer. Moreover, the ceramic pellets are limited in the amount of heat that can be transferred throughout the reactor tube core. Low heat transfer from the heat source located outside the reactor tubes necessitates high furnace temperatures, increased energy costs, and reactor tube walls that can lead to shortened or impaired reactor tube life. Mal-distribution of ceramic pellets in the core can create zones with poor reaction characteristics and hot spots on the tube, leading to poor performance and/or life. Reactor efficiency and productivity can be significantly reduced from the limited heat transfer and gas flow disruptions caused by the inherent properties and structural limitations of ceramic pellets.

Attempts by manufacturers to improve the ceramic pellets used in the reactor tubes have marginally improved heat transfer and deterioration and thus there remains a need for an improved catalyst support that promotes heat transfer, provides high surface area, and provides low pressure drop and can be easily implemented at a reduced cost. Various embodiments of foil-supported catalysts for use in tubular reactors are discussed below.

BRIEF SUMMARY

A reactor for carrying out catalytic reactions is provided. The reactor comprises a fan arranged on a central rod in a reactor tube. The fan can have radial fluid ducts for directing fluid flow through the reactor. The fluid ducts are effective for radially guiding fluid flow towards the reactor tube to assist in heat transfer. The fan has a top surface, bottom surface and an outer diameter face. The radial fluid ducts, formed by corrugations in the fan, terminate along the outer diameter face of the fan to form fluid duct openings, for example triangular openings, that face the reactor tube wall and thus promoting heat transfer from the reactor tube into the interior of the reactor.

A stackable structural reactor (SSR) is provided. The SSR comprises a reactor component that has a top surface, bottom surface and a circular outer diameter face. The reactor component can be arranged in a reactor tube, for example on a central rod disposed in the interior region of the reactor tube. A washer having an inner diameter and an outer diameter can be in contact with the top or bottom surface of the reactor component. The washer can extend radially outward from the circular outer diameter face of the reactor component such that the outer diameter of the washer does not contact the reactor tube, thus creating a annular gap between the reactor tube and the circular outer diameter of the washer.

BRIEF DESCRIPTION OF THE DRAWINGS

The following figures illustrate various aspects of one or more embodiments, but are not intended to limit the present inventions to the embodiments shown.

FIG. 15A shows a side view of a loaded reactor sleeve of fans arranged vertically on a central rod, wherein each fan has a single notch around its circumference.

FIG. 15B shows a side view of a loaded reactor sleeve of fans arranged vertically on a central rod, wherein each fan has multiple notches around its circumference.

FIG. 16 shows a side view of a loaded reactor sleeve of fans arranged vertically on a central rod, wherein each fan has a single notch around its circumference.

FIG. 17 shows a side view of a loaded reactor sleeve of fans arranged vertically on a central rod, wherein each fan has a single notch around its circumference.

DETAILED DESCRIPTION

As used herein, when a range such as 5-25 is given, this means at least or more than 5 and, separately and independently less than, and not more than 25. Materials of construction for all reactor components or parts thereof as discussed herein can include any suitable material as known in the art, for example, metal, non-ferrous metal, metal foil, steel, stainless steel, alloys, foils, non-metals such as plastics or glass, ceramic, or combinations thereof.

The reactors as described herein, sometimes referred to as a stackable structural reactors ("SSR"), can include multiple components arranged around a center support, such as a central rod or mandrel, pipe, post or the like in order to form a monolith of general annular cross section as viewed in the direction of flow of fluid through the reactor. As described herein, various modifications and embodiments of the reactors and associated reactor components can be used.

Figure 1:
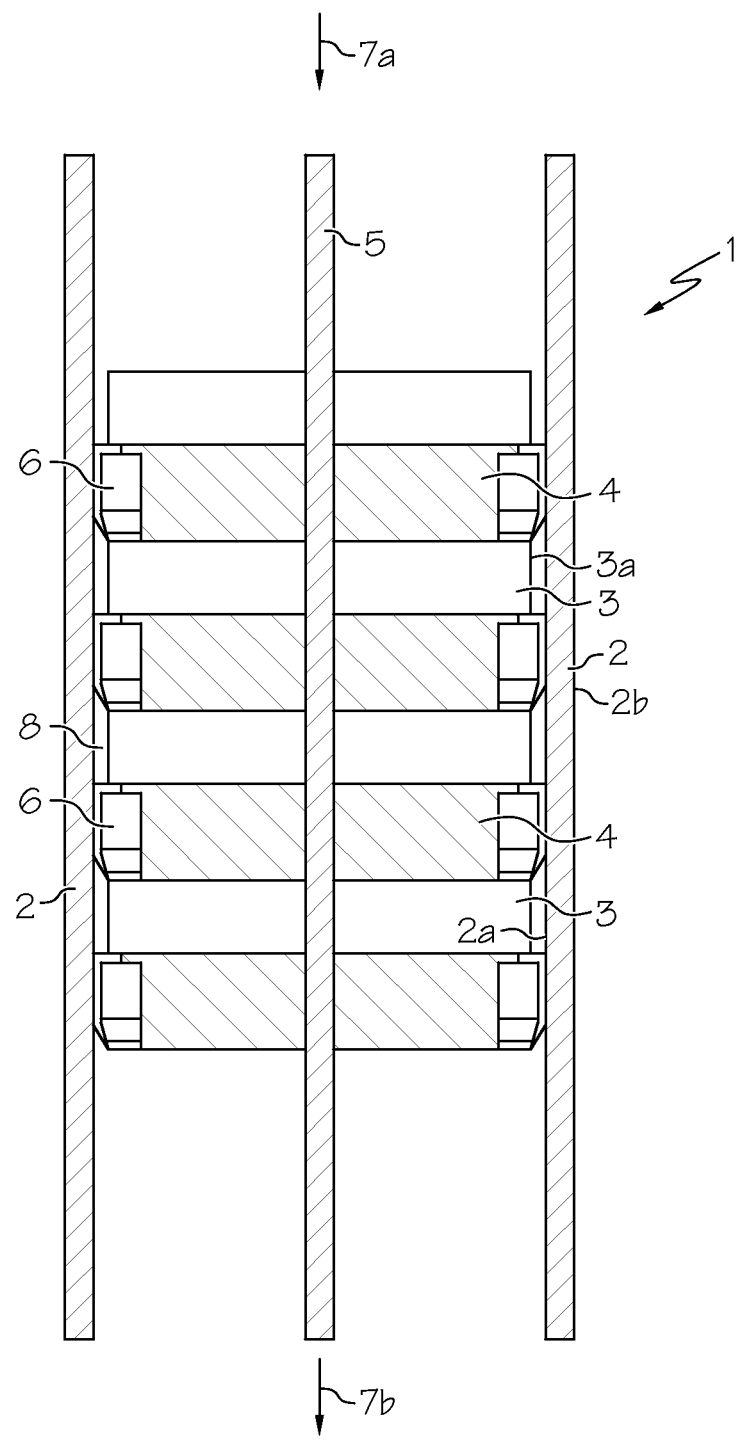
FIG. 1 shows a cross-section view of a reactor having a loaded reactor sleeve of an alternating arrangement of fans and cores.

An example structure of a reactor 1 is shown in FIG. 1. The reactor tube 2 having an inner diameter wall face 2a and an outer diameter wall face 2b, such as a reformer tube, houses reactor components, such as a fan 3 and/or core 4, arranged on a central rod 5. The reactor tube 2 is generally known in the art and is preferably made of metal, such as steel, stainless steel, aluminum or Inconel, or special spun-cast alloys such as HP50; alternatively (and preferably if the reaction is a low temperature reaction like CO to $CO_2$) made of polymeric or plastic material. It is preferably a tube having a circular, rectangular, oval, or other cross-section. The length of the reactor tube 2 can be at least 0.6, 1, 2, 4, 6, 8, 10 or 12 m and preferably in the range of 0.6 to 2 m or 6 to 15 m. The reactor tube 2 can have a circular cross section with an inner diameter of at least 25, 50, 75, 100, 125, 150, 175, 200, 225 or 250 mm and preferably in the range of 80 to 140 mm. The diameter of the reactor tube 2 is preferably constant along its entire length.

Reactor components, such as fans 3 and cores 4, are constructed to have a central hole or aperture for receiving the central rod 5 such that the components can slide on the central rod 5 and be positioned in the reactor tube 2. The central rod 5 can have a length to accommodate the length of the reactor tube 2. Alternatively, multiple rods, such as 2 to 10 rods, can be used, for example in a stacking manner, to accommodate tube 2 length, which can mitigate thermal expansion of components. The rod 5 can have a circular cross section diameter of at least 5, 10, 25, 50, 75, 100, 125 or 150 mm and preferably in the range of 6 to 40 mm. For fitting purposes, the reactor components can have a central hole or aperture the same as or slightly greater than the circular cross section diameter of the rod 5. The central rod 5 can further include a bracket, bushing, base plate and the like for providing a stop fitting so the components 3, 4 do not slide off of the central rod 5. The central rod 5 can be preloaded with any number of reactor components 3, 4 or washers before being inserted in the reactor tube 2. As shown, the fans 3 and cores 4 can be stacked vertically, one on top of another, to form alternating layers of reactor components such that each fan 3 is in contact with and arranged between two cores 4 located below and above the fan 3. Washers as described below can be inserted between one or more reactor components as desired, for example, each fan and core can be separated by a washer wherein the washer creates an open space between the components. Alternatively, in contrast to alternating layers, the reactor components 3, 4 can be arranged in any desirable manner, for instance the rod 5 can be loaded with all fans 3 without one or more cores 4.

Generally, 24 to 400 or more reactor components can be arranged or stacked inside a reactor tube 2, for example in any alternating manner, wherein the stacked arrangement accommodates fluid flow through each reactor component located in the reactor tube 2. In an example, a reactor tube for a fuel cell can contain 24 to 72 vertically-stacked reactor components. In another example, a reactor tube for a hydrogen reformer can contain 200 to 400 or more vertically-stacked reactor components. Although reactor components are shown vertically stacked herein, the components can be arranged in alternative ways such as horizontal to accommodate orientation of a reactor or certain technology requirements.

Fluid, such as gas or liquid, to be reacted generally flows vertically, either up flow or down flow as desired, through the reactor tube 2 and through each component 3, 4 arranged on the central rod 5. Reactor components 3, 4 direct fluid flow in other non-vertical directions to increase heat transfer, for example fans 3 direct or guide fluid flow radially (perpendicular to the overall vertical direction) towards the reactor tube wall. As shown, fluid enters the reactor tube 2 at opening or inlet 7a, flows through the vertically-arranged fans 3 and cores 4, and exits the reactor tube 2 at opening 7b. The fans 3 and cores 4 preferably have lateral dimensions so that each component 3, 4 will entirely or substantially fill the cross-sectional area of the reactor tube 2. The fans 3 and cores 4 can be in contact with the inner wall surface 2a of the reactor tube 2, which effectively transfers heat from the exterior of the reactor to the reactor components 3, 4 and fluid contained therein. The cross-sectional diameter, if circular, of a fan 3 can be at least 20, 50, 100, 150, 200 or 250 mm and preferably in the range of 80 to 135 mm. The fan 3 can have a height of at least 7, 15, 30, 45, 60 or 65 mm and preferably in the range of 20 to 40 mm. The cross-sectional diameter, if circular, of a core 4 can be at least 20, 50, 100, 150, 200 or 230 mm and preferably in the range of 60 to 120 mm. The core 4 can have a height of at least 6, 15, 30, 45, 60 or 80 mm and preferably in the range of 10 to 30 mm.

Preferably, the fans 3 located within the reactor tube 2 have a diameter less than the inner diameter of the reactor tube 2 to create a gap 8 or free space between the outer diameter edge or face 3a of the fans 3 and the inner wall surface 2a of the reactor tube 2. The gap 8 between the outer edge diameter face 3a of the fans 3 and the inner wall surface 2a of the reactor tube 2 can be at least 1, 2, 3, 5, 10 or 15, mm and preferably in the range of 1 to 8 mm. As discussed below, the gap 8 promotes heat transfer and forces fluid flow traveling toward the inner wall surface 2a of the reactor wall 2 to be directed back towards the inner portion of the reactor. In other words, the gap 8 serves to redirect the fluid flow such that flow is allowed to turn 180 degrees as it comes into contact with the inner wall surface 2a of the reactor tube 2.

Fluid flow through the reactor tube 2 can be further altered by adding a seal 6 to the outer edge of a reactor component, such as a core 4, so fluid does not flow between the outer perimeter edge of each core 4 and the inner wall surface 2a of the reactor tube 2. Thus, the seals 6 prevent the fluid flow from bypassing the cores 4 around the perimeter. The seals 6 direct the fluid through each core 4 and into another component such as a fan 3 located below of above the core 4 depending on the direction of fluid flow. Preferably, the seals 6 are positioned at the outer diameter edge of each core 4 and have a ring shape to enclose the entire vertical outer diameter edge and a portion of the lateral top or bottom surface near the outer diameter edge of the core 4. As shown, the fans 3 do not include a seal for preventing fluid from flowing between the outer diameter edge 3a of each fan 3 and the inner wall surface 2a of the reactor tube 2. Seals are not used with the fans so fluid flow is directed to the reactor tube wall to promote heat transfer to the interior portion of the reactor. Examples of alternative structural components are described below in separate embodiments.

The stacked arrangement of fans 3 and/or cores 4 is designed to promote heat transfer for carrying out catalytic reactions. As such, reactor 1 components, such as fans 3 and/or cores 4, or washers can be coated with a catalyst to effectively distribute catalyst contact with most of the volume of fluid flowing through the reactor. Preferably, seals are not coated with a catalyst. Catalytic material is known in the art and can include nickel, palladium, platinum, zirconium, rhodium, ruthenium, iridium, cobalt and aluminum oxide. The arrangement of stacked components 3, 4 is not likely to form powder due to expansion and contraction because there is no single mass of ceramic pellets forming a packed bed. It is also unlikely, using the arrangements discussed herein, that the expansion and contraction of the reactor tube 2 would have any effect on the catalyst.

For efficiency, different catalytic reactions and processes are carried out at different preferred temperatures in the reactor 1. Accordingly, the reactor tube 2, fans 3, cores 4 and the like are selected based upon what environment (temperature, pressure, velocity, gas or liquid composition) they will experience. Suitable materials are preferably those which perform effectively, or most effectively, or efficiently, or most efficiently at, and can effectively tolerate, process temperatures of at least −20, −10, 0, 4, 10, 15, 20, 25, 30, 50, 80, 100, 150, 200, 250, 300 or 350° C. and process temperatures not more than 1000, 900, 700, 500, 400, 350, 300, 250, 200, 150, 100, 80, 50, 30 or 27° C.

Figure 2:
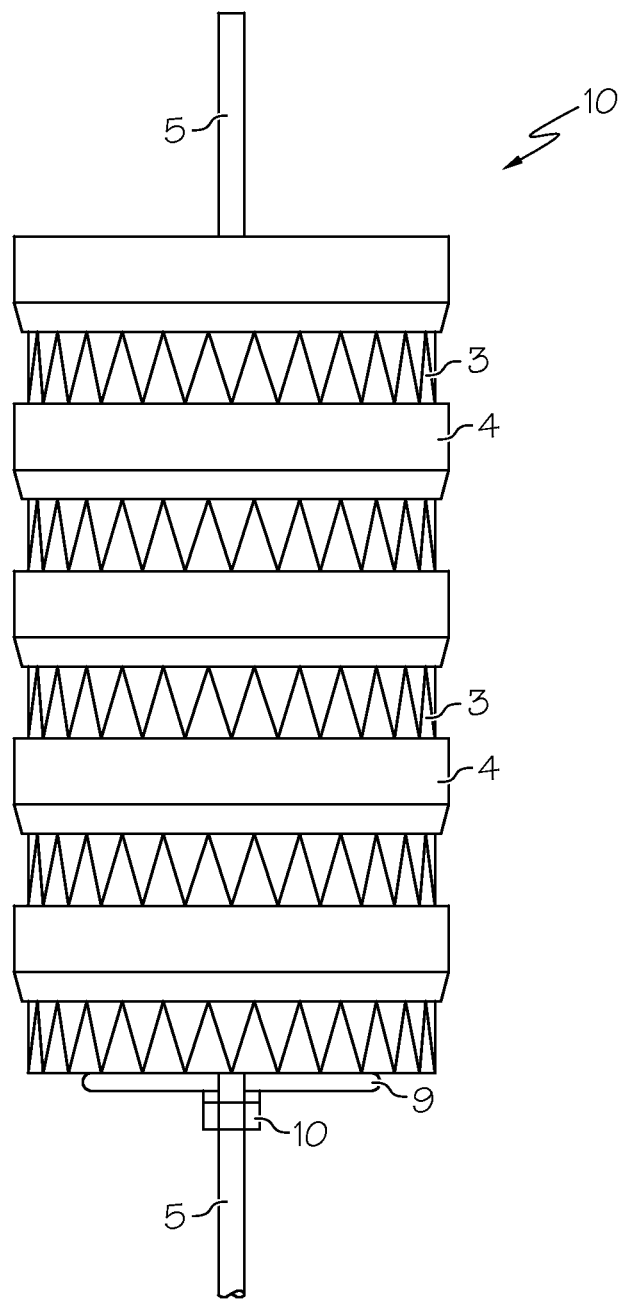
FIG. 2 shows a side view of a loaded reactor sleeve of an alternating arrangement of fans and cores arranged on a central rod for use in a reactor tube.

FIG. 2 shows schematically a loaded reactor sleeve 10 having a plurality of fans 3 and cores 4 arranged vertically in alternating order on a central rod 5 for insertion in a reactor tube, for example as shown in FIG. 1. The central rod 5 has a base plate 9 positioned near its bottom portion for supporting the series of fans 3 and cores 4 aligned vertically on the rod 5. As shown, the base plate 9 can be circular, such as a disk or plate, with an opening for fitting onto the central rod 5. As viewed from its top or bottom surface, the plate 9 can be a solid disk or have other openings for allowing fluid to flow through and enter the center portions of a reactor component such as a fan. For example, the plate 9 can have perforations, channels or triangular openings arranged to form a hub and spoke configuration. The circular plate extends laterally out from the central rod 5 such that a bottom surface of a fan 3 or core 4 can rest directly on the top surface of the base plate 9. The base plate 9 can have any diameter up to that of the inner diameter of the reactor tube.

The base plate 9 can be secured or set in place by the use of a bushing 10 positioned directly below the base plate 9. The bushing 10 acts as stop for the base plate 9 such that once the base plate is slid onto the central rod 5 it stops upon contact with the fixed bushing 10. The bushing 10 may be adjustable so that the desired base plate 9 location can be altered depending on the number of reactor components being stacked on the central rod 5. Preferably, base plate 9 can be permanently attached to the central rod 5 at the desired location. For example, the base plate 9 can be welded onto the central rod 5 or be an integral part of the central rod 5 structure.

Figure 3:
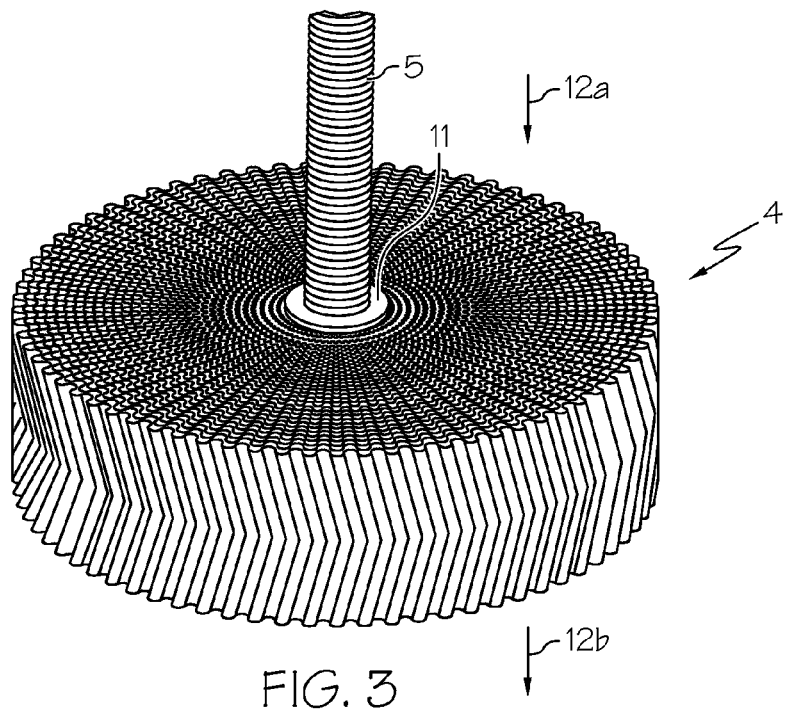
FIG. 3 shows a perspective view of a core arranged on a central rod for use in a reactor tube.

In one embodiment, FIG. 3 shows an example spiral-wound core 4 positioned on a central rod 5 for use in a reactor tube. The core 4 can be formed by spiraling metal foil, such as flat, rippled or corrugated metal foil, around its center or a support tube 11 suitable for fitting onto a central rod 5. For instance, metal foil can be secured to the support tube 11, such as by welding. The metal foil can then be wound around the support tube 11 until the desired core 4 diameter is achieved. For fitting purposes, the optional support tube 11 can be used, either attached or unattached (loose) to the core, to fill any void space between the inner diameter wall of the core 4 or fan and the outer diameter face of the rod 5. The spiral winding of the core defines one or more annular flow channels so that fluid can flow in one end 12a of the core 4, through the channels, and out the other end 12b of the core 4.

The number and density of annular flow channels can be controlled as known in the art by tightly or loosely winding the metal foil around its center or a support tube 11. The thickness of the metal foil for forming the cores 4 can be selected to optimize the number of channels, for example, a thin metal foil will provide more channels for accommodating fluid flow than a thicker metal foil. The cores 4 preferably contain a high density of surface area and thus enhance catalytic activity when coated with a catalyst. Any desirable number of cores 4 can be stacked on a central rod 5, such as being alternated with one or more fans 3.

Figure 4:
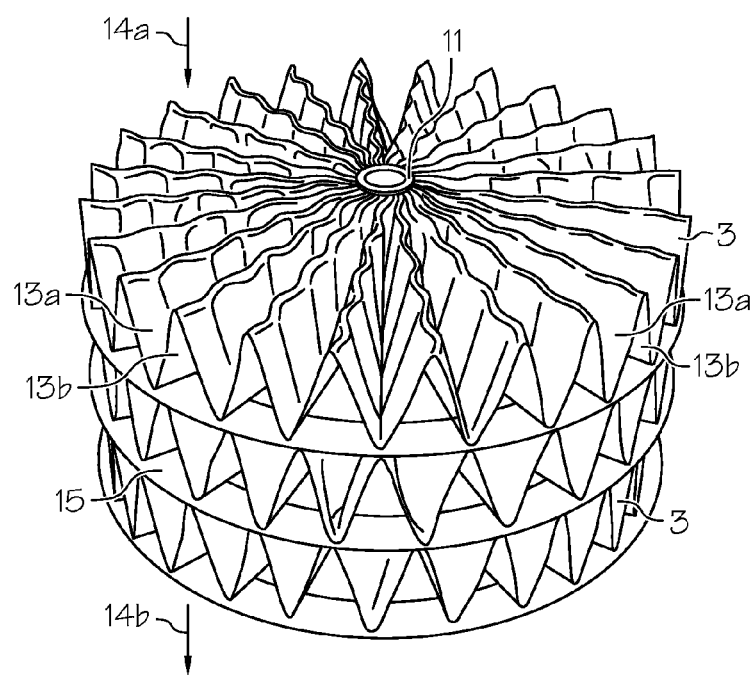
FIG. 4 shows a perspective view of stacked fans having washers positioned between each reactor fan for use in a reactor tube.

In another embodiment, FIG. 4 shows multiple fans 3 stacked vertically with one another for use on a central rod (not shown). Each fan 3 has a top surface and a bottom surface such that the bottom surface of one fan 3 is in either close proximity with, or directly in contact with the top surface of another fan positioned directly below. That is, depending on the topography of the top or bottom surface of a fan 3, which may be irregular or generally flat, the entire top or bottom surface of a fan, or at least a portion thereof if irregular, directly contacts the top or bottom surface of another fan depending on its position above or below. In the instances a washer separates fans, at least a portion of the top or bottom surface of a fan is in direct contact with the top or bottom surface of the washer.

As arranged on a support tube 11, the fans 3 have multiple radial fluid ducts 13a and 13b for directing fluid flow through the reactor. As shown, the radial fluid ducts are of approximately triangular shape and extend outward from the support tube 11 to form a circular cross section as viewed from the top of the fans 3. The radial fluid ducts terminate along the outer diameter face of each fan to form triangular openings facing the inner wall surface of the reactor tube. As viewed in the downward direction of fluid flow, fluid flows in one end 14a of the stack of fans 3, radially through the triangular-shaped ducts openly facing upward 13a towards the outer diameter face of the fans 3 for contacting the reactor tube, around the outer diameter face of the fans 3 into the triangular-shaped ducts openly facing downward 13b, radially towards the center of the fans 3 and onto the next fan and/or core in the same manner until the fluid exits the stack of fans 3 at the other end 14b. In one arrangement, for example as shown in FIG. 4, the fans 3 can be stacked in an arrangement that vertically aligns the approximately triangular-shaped ducts openly facing upward 13a of one fan with the approximately triangular-shaped ducts openly facing downward 13b of the fan 3 positioned directly above or below.

Figure 5:
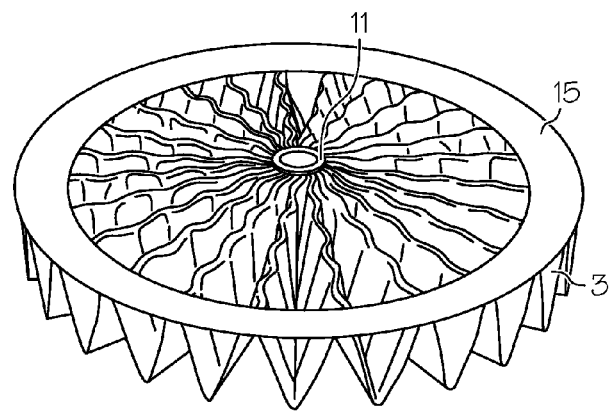
FIG. 5 shows a perspective view of a fan having a washer attached to the top surface of the fan.

Flat washers 15 are preferably positioned between the top or bottom surfaces of each fan 3. For fitting and assembly purposes, as described herein, washers can be attached to the fans or positioned loosely (unattached) between each fan. FIG. 4 shows flat washers 15 attached to the bottom surface of the fans 3 whereas FIG. 5 shows a flat washer 15 attached to the top surface of a fan 3. The flat washer 15 can provide additional structural strength to the fans 3. The flat washers 15, like the various washers described below, can be sized such that various positions along the top or bottom surface of a reactor component can be achieved. For example, the outer diameter of the washer 15 can be inside, flush or extend beyond the outer diameter face of a fan 3. As shown, the outer diameter of the flat washer 15 is flush with the outer diameter face of the fan 3.

In operation, the stack of fans 3 having flat washers 15 is positioned on a central rod and the loaded reactor sleeve is inserted into a reactor tube. The flat washers 15 are configured to have the same or slightly less diameter than the inner diameter of the reactor tube as noted above. For example, the outer diameter of the flat washer 15 can be at least 25, 50, 75, 100, 125, 150, 175, 200, 225 or 250 mm and preferably in the range of 80 to 140 mm. The flat washer 15 can have a ring width of at least 5, 10, 15, 20, 25, 30, 35 or 40 mm and preferably in the range of 6 to 12 mm. The inner diameter of the flat washer 15 can be in the range of 20 to 245 mm or as necessary for the desired width and outer diameter thereof as discussed above. As positioned on or near the top or bottom surface of a fan, the outer diameter of the flat washer 15 can be at least 5, 10, 15, 20, 25, 30, 35 or 40 mm less than the outer diameter of a fan to ensure that fluid flow around the outer diameter face of a fan is not interrupted. Alternatively, the washer can extend outward beyond the outer diameter face of a fan to create a gap between the outer diameter of the washer 15 and the inner wall surface of the reactor tube. The gap can be at least 1, 2, 3, 5, 10 or 15, mm and preferably in the range of 1 to 8 mm. Depending on the size of gap created by the washer, pressure drop can be controlled and adjusted as desired. The gap ensures that some fluid flowing through the reactor bypasses the washer around its perimeter as it travels over the washer and through the gap. The bypass of fluid around the washer generally does not promote heat transfer whereas fluid flow over the outer diameter face of a fan promotes significant heat transfer because of turbulence from the corrugations of the fan and the fluid flow being directed radially outward from the fluid ducts.

The flat washers 15 can be in close proximity but do not contact the inner wall surface of the reactor tube such that a significant portion of the overall fluid flow travels radially though the upward facing triangular duct of a fan 3 and contacts the reactor tube wall and is partially redirected either through the downward facing adjacent triangular duct of the fan 3 or around the outer diameter of the washer. The flat washers 15 ensure that a significant portion of the flow penetrates the center area of the fan. The flat washers 15, preferably having a substantially open center as shown, allow the redirected portion of the fluid to travel back into the triangular ducts of the fan 3 located above or below depending on direction of fluid flow through the reactor, which fills the center of the fan with fluid. As fluid travels radially back towards the reactor tube, it is mixed with the portion of fluid that traveled over the outer diameter of the washer. The fans 3 as shown in FIGS. 4 and 5 can be prepared by initially selecting a corrugated (or finned) strip of metal foil. The corrugations of the strip of metal foil can have substantially flat faces or, alternatively, contain rippled or nonuniform faces as shown. The corrugated strip of metal foil can be fanned out to form a ring or annular disk having an inner diameter defining an opening for receiving a central rod. The inner diameter face of the fan can be optionally attached to a support tube 11, for example by welding, to provide structural support to the fan and accommodate receiving a central rod for mounting purposes. The support tube can also be loosely positioned in the interior section of that fan 3 to fill any void space that can be created as the fan is fitted onto a central rod. The fanned ring also has an outer diameter face that defines triangular duct faces as described above as viewed along the outer diameter surface of the fan.

Figure 6:
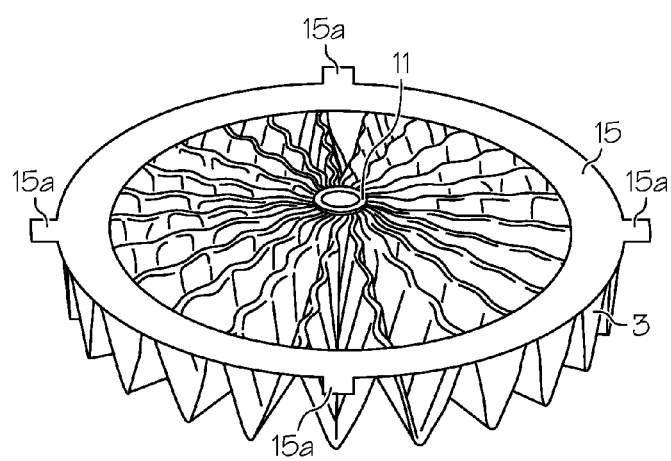
FIG. 6 shows a perspective view of a fan having a washer with spacing tabs attached to the top surface of the fan.

FIG. 6 shows another embodiment of a washer wherein spacing tabs 15a can be added to the outer diameter of a washer. As shown, the spacing tabs 15a extend radially outward from the outer diameter of the washer 15. Measured from the outer diameter of the washer 15, the spacing tabs 15a can extend radially outward at least 1, 2, 3, 5, 10, 15, 20, 25 or 30 mm and preferably in the range of 1 to 8 mm. The width of the spacing tab 15a can be adjusted as desired. The spacing tabs 15a can be attached to the outer diameter of the washer 15, for example by welding, or alternatively the tabs can be an integral part of the washer.

A washer 15 can have one or more spacing tabs 15a, for instance a washer can have at least 2, 3, 4, 5, 6, 7, 8, 9 or 10 or more spacing tabs 15a. The spacing tabs 15a prevent the outer diameter face of a reactor component from contacting the inner wall surface of a reactor tube. For example, if the outer diameter of a washer 15 is positioned flush with the outer diameter face of a fan 3 as shown, the length of the spacing tabs 15a can maintain a minimum distance that the outer diameter face of the fan is spaced from the inner wall of a reactor tube. In another example, the washer, in relation to a fan, can have an outer diameter less than the fan. In such a case, the spacing tabs may need to be longer to ensure a gap between the outer diameter face of the fan and the reactor tube. In both examples the washer is attached to the fan to prevent the fan from sliding during operation and contacting the inner wall of the reactor tube.

Figure 7:
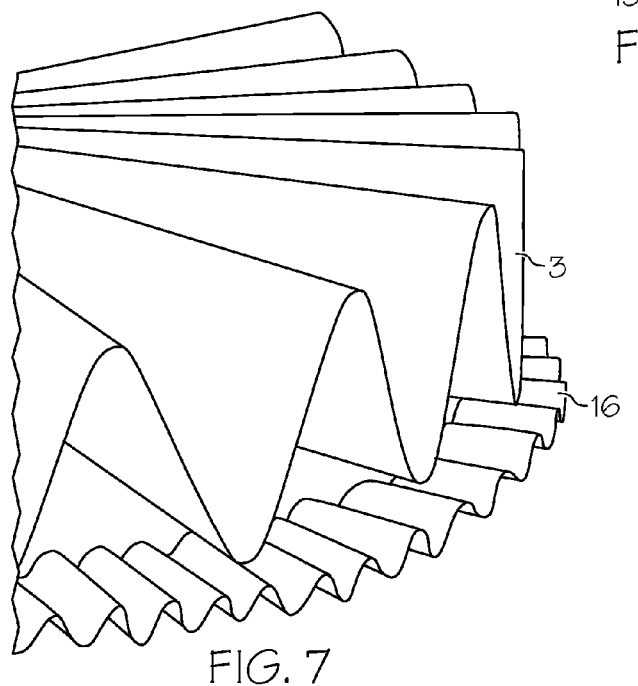
FIG. 7 shows a perspective view of a portion of a fan having a corrugated washer attached to the bottom surface of the fan.

FIG. 7 shows a corrugated washer 16 attached to the bottom surface of a fan 3 for use in a reactor tube. Alternatively, the corrugated washer 16 can be attached to the top surface of a fan 3, for example by welding. As shown, the corrugated washer 16 extends radially beyond the outer diameter of the fan 3. The preferred dimensions of the corrugated washer 16 can be the same or substantially the same as those recited with regard to the flat washer 15. The corrugated washer 16, like the flat washer 15 of FIGS. 4-6, can be positioned on the top or bottom surface of a fan to provide a predetermined gap between the outer diameter face of the washer 16 and the inner wall surface of a reactor tube such that fluid flow bypassing the washer and pressure drop can be controlled as desired.

Although not shown, in another embodiment, a spacer can be attached to the corrugated ring washer 16, for instance in a bottom peak or valley of a corrugation. A spacer can be a wire, piece of metal, such as rectangular tab, or the like. For example, a piece of metal wire can be welded to the washer 16 in an arrangement that the spacer extends outward or radially from the outer diameter of the washer 16 and reactor component that the washer may be attached to and towards the inner wall surface of a reactor tube. The remaining portion of the spacer not extending outward can be adjusted to any desired length and preferably not greater than the ring width of the washer 16 so the spacer does not protrude inward beyond the inner diameter of the washer 16. The length of the metal wire can be adjusted to provide the desired length of wire extending outward from the washer 16 and/or reactor component so the gap between the washer 16 and reactor tube can be controlled. Preferably, the spacer can extend at least 1, 2, 3, 5, 10 or 15 mm and preferably in the range of 1 to 8 mm from the outer diameter face of the washer.

Figure 8:
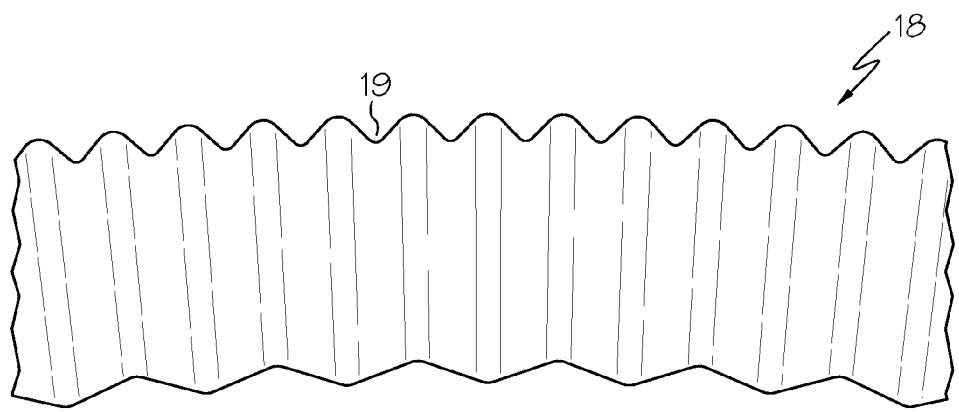
FIG. 8 shows a top view of a portion of a castellated washer for use with a reactor component.

FIG. 8 shows a portion of a castellated washer 18 for use with a reactor component, such as a fan 3. Preferably, the castellated washer 18 is configured to have the same or slightly less of a diameter than the inner diameter of a reactor tube. For example, the outer diameter of the castellated washer 18 can be at least 25, 50, 75, 100, 125, 150, 175, 200, 225 or 250 mm and preferably in the range of 80 to 140 mm. The castellated washer 18 can have a ring width of at least 5, 10, 15, 20, 25, 30, 35 or 40 mm and preferably in the range of 6 to 12 mm. The inner diameter of the castellated washer 18 can be in the range of 20 to 245 mm or as necessary for the desired width and outer diameter thereof as discussed above. The castellated washer 18 can have notches or grooves 19 in its outer diameter for permitting fluid to flow around the perimeter of the washer. The notches 19 can be any shape, such as square, triangular, curved or a combination thereof, and have any dimensions, for example the width and depth of notches 19 can be adjusted as desired. For instance, the depth of the notches 19 can be at least 1, 2, 3, 5, 10 or 15 mm and preferably in the range of 1 to 8 mm. As shown in FIG. 8, the notches 19 are generally triangular in shape.

The castellated washer 18 is preferably positioned on a reactor component such that the entire notch 19 or a portion thereof extends radially beyond the outer diameter face of the reactor component. For instance, the notches 19 can extend at least 1, 2, 5, 10 or 15 mm beyond the outer diameter face of a fan 3. Attached to a fan, the depth of the notches 19 of a castellated washer 18 can provide a predetermined gap between the outer diameter face of the fan 3 and the inner wall surface of a reactor tube such that fluid flow and pressure drop can be controlled. The notches 19 also allow fluid to flow between the grooves 19 and into fluid ducts of the fans above or below the washer 18 depending on the direction of fluid flow. The depth and width of the notches 19 can be adjusted to control pressure drop and the amount of fluid flowing over the outer diameter of the washer.

Figure 9:
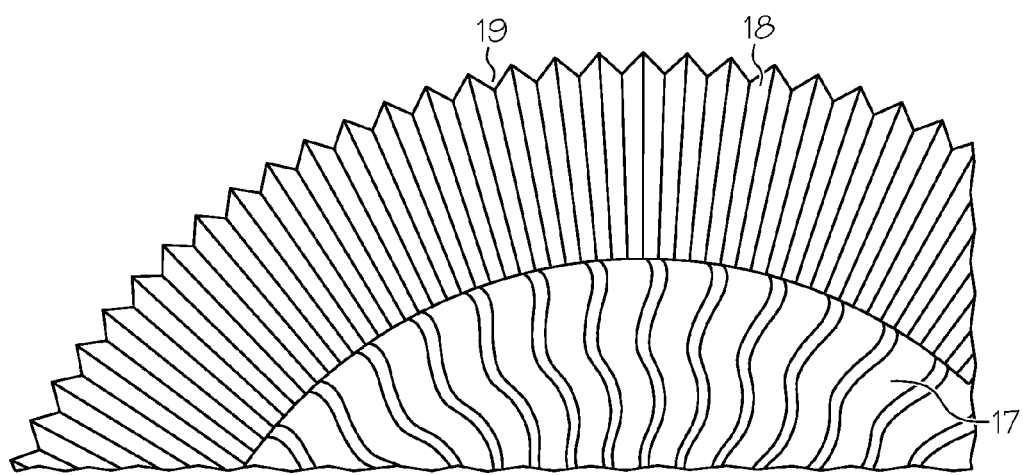
FIG. 9 shows a top view of a castellated washer attached to the top surface of a reactor component.

As shown, the castellated washer 18 can be corrugated to accommodate the peaks or grooves defined by the fluid flow ducts, such as triangular faced ducts, of a fan or reactor component for fitting purposes. For example, FIG. 9 shows a castellated washer 18 attached to the top surface of a fan 3. The corrugations of the castellated washer 18 fit and align with the rippled and corrugated top surface of the downward facing triangular fluid ducts of the fan 3 to ensure a customized fit. To accommodate the shape of a fan 3 or fluid ducts of a reactor component, the corrugations of the castellated washer 18 can be at least 1, 2, 3, 4, 5, 6, 7, 8, 9, 10, 11, 12 or 13 mm and preferably in the range of 2 to 7 mm.

Figure 10:
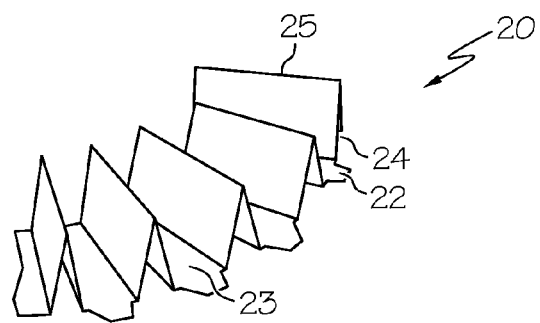
FIG. 10 shows a perspective view of a castellated washer having spacing tabs for use with reactor component.

In another embodiment, FIG. 10 shows a portion of a castellated washer 20 for use with a reactor component, preferably a fan 3 for finned foil. For example, the castellated washer 20 can be attached to a fan 3 as shown in FIGS. 4-7 or be used with a spiral shaped finned foil. The castellated washer 20 preferably has the same outer diameter, inner diameter and ring width as the washer 18 shown in FIGS. 8 and 9 discussed above.

The castellated washer 20 can have spacing tabs 22 for creating a predetermined gap between the outer diameter face of a fan 3 and the inner wall surface of a reactor tube such that the outer diameter end of the spacing tabs directly contacts the inner wall of the reactor tube. The spacing tabs 22, as measured from the outer diameter face of the triangular corrugations 24 of the castellated washer 20, can be at least at least 1, 2, 3, 5, 10 or 15 mm and preferably in the range of 1 to 8 mm. The spacing tabs 22 can be attached to the castellated washer 20, for example by welding, or be an integral portion of the washer. As shown, the spacing tabs 22 are positioned on the flat sections 23 of the washer 20. The flat sections 23 provide a contact surface for attaching the castellated washer 20 to a reactor component such as a fan 3. For instance, one or more flat sections 23 can be welded to the top or bottom surfaces of a fan 3 in a similar arrangement as shown in FIGS. 4-7.

Figure 11:
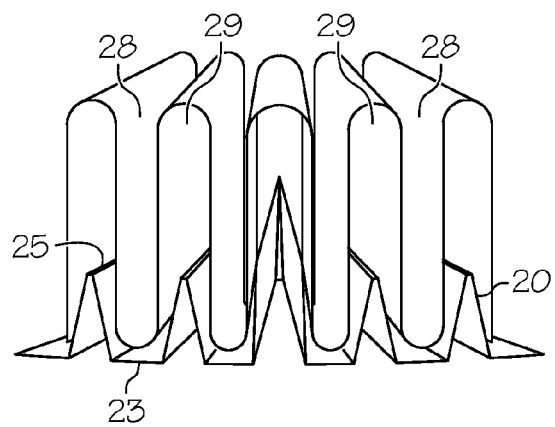
FIG. 11 shows a top view of a portion of a reactor component having a castellated washer adjacent thereto.

Positioned in between the flat sections 23 of the castellated washer 20 are corrugated peaks 25. The corrugated peaks 25 provide flexibility to the castellated washer 20 such that it can flex to accommodate arrangement with a particular reactor component. In operation, the corrugated peaks 25 fit in the radial fluid ducts of a reactor component. As shown in FIG. 11, the corrugated peaks 25 are positioned in fluid ducts of a finned foil 27 for use in a reactor tube.

Figure 12:
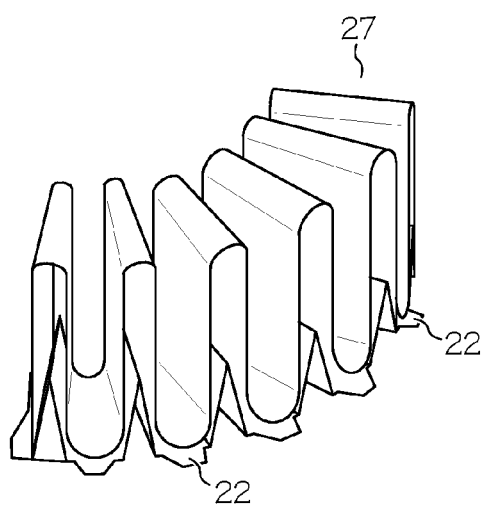
FIG. 12 shows a perspective view of a portion of reactor component having a castellated washer with spacing tabs attached thereto.
Figure 13:
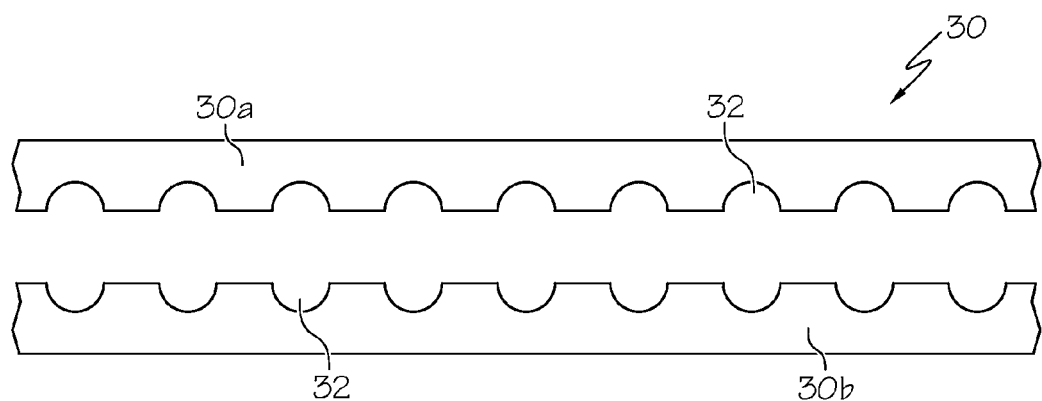
FIG. 13 shows a top view of a portion of a castellated blank base plate for forming a castellated washer or reactor component.

FIG. 11 shows a portion of a finned foil viewed from in the direction facing the inner wall of a reactor tube. The finned foil 27 is corrugated to provide discrete fluid ducts 28, 29 for directing fluid flow through a reactor. The castellated washer 20 can be attached to a finned foil by welding the flat sections 23 to the ends of the fluid ducts 28 or 29. Preferably, the washer 20 is attached to the finned foil 27 in an arrangement where the base of the spacing tab 22 begins at the outer diameter face of the finned foil 27 wherein the spacing tab extends outward from the outer diameter face of the finned foil 27 to the inner wall surface of a reactor tube, and preferably contacts the inner wall. For example, FIG. 12 shows a perspective view of a portion the finned foil 27 of FIG. 11 having spacing tabs 22 extending outward or radially from the outer diameter face of the finned foil 27. As discussed below with respect to FIGS. 20 and 21, a reactor component or finned foil can be spiral wound with the castellated ring washer 20 for insertion into a reactor tube.

As discussed herein various embodiments of washers for use with reactor components are described. A method for forming a castellated washer can include the step of selecting a sheet of metal foil, such as a flat strip of metal foil having a length and width to accommodate the dimensions of a castellated washer. In one example, the width of the metal foil is at least twice that of the desired ring width of a single castellated washer as recited above. A series of holes can be punched in a straight line along the entire length of the metal foil to form a punched metal foil 30. The holes 32 can be spaced apart or immediately adjacent one another depending on the spacing and size of corrugations and notches in the final configured washer. The diameter of the holes 32 can be selected to provide a predetermined gap that in operation equates to a spaced distance between the outer diameter face of a reactor component and a reactor tube. The punched metal foil 30 can be split or cut into two notched metal foil strips 30*a* and 30*b*. Preferably the punched metal foil 30 is split at the center diameter of the series of holes 32.

Figure 14:
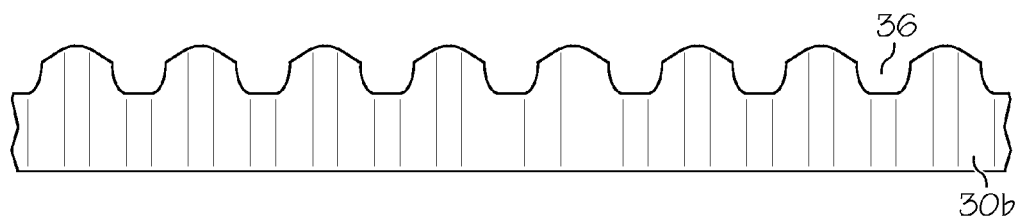
FIG. 14 shows a portion of a castellated washer formed from the castellated blank base plate of FIG. 13.

The notched metal foil strips 30*a* and 30*b* can be corrugated as shown in FIG. 14. The notched metal foil strips can be corrugated at varying degrees of corrugation density, for example a corrugated peak can be positioned on each side of a single notch 36. As shown, notched metal foil strip 30*b* has corrugated peaks at the center of each notch 36 and on each side of the notch, although such structured placement of corrugations is not necessary since notches 19 and density thereof will determine what portion of fluid flows over the outside of the washer. The corrugated and notched metal foil strips can be further formed into rings to form a castellated washer for attaching to a reactor component such as a fan or finned foil.

In another embodiment, a metal foil can be selected with a width of at least twice that of the desired radius of a fan or finned foil. Similar to the method for forming a washer, the wider metal foil can be punched with a series of holes along its center and entire length before the foil is split into two notched strips. The notched strips can be corrugated and fanned out into a ring to form a fan having a diameter of twice the width of the notched strip as measured inclusive of the notch depth or radius of center hole. Depending on the depth of the notches, as determined by the diameter of holes punched in the metal foil, a castellated fan can be formed wherein the outer diameter face of the fan contains notches along the entire height of the outer diameter fan face creating a castellated, gap-controlling edge. The castellated fan can be optionally fitted with a washer, however the notches of the fan can be sufficient for creating a desired gap between the outer diameter face thereof and the reactor tube.

Various embodiments relating to the stacking arrangement of reactor components in a reactor tube, as shown in FIGS. 15-17, will now be described. As described herein, nose and nose portions are used interchangeably. FIG. 15A shows a series of fans 40 stacked vertically on a central rod 44 in a reactor tube 42. The outer diameter faces of the fans 40 have a single notch 45 extending uniformly around the perimeter of the fan. The notch 45 creates a gap between the outer diameter face of the fans 40 and the reactor tube 42. The notch 45 can have a radial depth of at least 1, 2, 3, 5, 10 or 15 mm and preferably in the range of 1 to 8 mm. The depth of the notch 45 also corresponds to the gap length created between the outer diameter face of the fans 40 and the inner wall of the reactor tube 42. The notch 45 can be any height and less than the overall height of the fans 40 and preferably the height of the notch 45 can be at least 4, 10, 20, 30, 40 or 50 mm and preferably in the range of 10 to 30 mm.

As viewed vertically, the fans 40 have an upper and lower nose, 46a and 46b, respectively. The upper and lower noses 46a and 46b extend radially around the perimeter of the fans 40 and define the height of the notches 45. Preferably, as shown, the nose portions 46a, 46b of the fans 40 are in contact with the inner wall surface of the reactor tube 42. In contact with the inner wall surface of the reactor tube 42, the nose portions 46a, 46b of the fans 40 ensure a gap between the recessed portion of the fan or notched portion 45 and reactor wall where fluid flowing through the reactor into each fan 40 can flow over the outer diameter face of the fan. Fluid flow is allowed to contact the reactor tube 42 in the notched 45 portions for promoting heat transfer before being redirected back into the reactor core region. Alternatively, the nose portions can be spaced away from the reactor tube 42. The upper and lower noses 46a, 46b can have a height of at least 2, 4, 8, 10, 15, 20, 30 or 35 mm and preferably in the range of 5 to 20 mm.

In the stacked arrangement of FIG. 15A, washers 41 are positioned between each fan 40 such that either the top or bottom surface of each fan 40, or a portion thereof, contacts a washer 41. As shown, the outer diameter of the washers 41 is flush with the innermost diameter of each fan 40 or the innermost recessed portion of each notch 45. Alternatively, the washers 41 can be positioned such that the outer diameter of the washers 41 extends beyond the innermost recessed portion of the notches 45 or inward from the same.

FIG. 15B shows a series of fans 40 stacked vertically on a central rod 44 in a reactor tube 42. The outer diameter faces of the fans 40 have four notches 45 extending uniformly around the perimeter of the fan. Although the fans 40 are shown with four notches, any number of notches can be included depending on the height of the fan used and the amount of pressure drop available across the total length of the reactor. For example, a fan 40 can have at least 1, 2, 3, 3, 5, 6, 7, 8 or more notches. The notches 45 can have a height and depth as described with respect to the notches shown in FIG. 15A.

The fans 40 of FIG. 15B have upper, middle and lower noses 46a, 46c and 46b, respectively. The nose portions 46a, 46b, 46c preferably contact the reactor tube 42 to ensure a gap between recessed fan perimeter or notches 45 and reactor wall to allow fluid to flow around the perimeter of each fan 40. The nose portions 46a, 46b, 46c can have a height as described with respect to the nose portion shown in FIG. 15A. The nose portions 46a, 46b, 46c extend radially around the perimeter of each fan 40 to define the notches 45 wherein three middle noses 46c are located between the upper and lower noses 46a, 46b of each fan 40. FIG. 15B shows only fans 40 having 4 notches arranged vertically however fans having greater or fewer notches can be included in the vertical stack in any order as desired. Washers 41 separate each fan 40.

In another embodiment, FIG. 16 shows fans 40 separated by washers 41 and stacked on a central rod 44 in a reactor tube 42. The fans 40 have a single nose 48 positioned at the top portion of each fan 40. The portion of the outer diameter face of the fan 40 separate from the nose 48 is recessed to form a notch 49 defining a radial gap around the perimeter of each fan 40. Arranged vertically, the nose 48 of one fan 40 is adjacent the bottom portion of the notch 49 of the fan 40 directly above. Thus, the nose 48 of one fan 40, when stacked next to another fan 40 with a single nose 48, defines the height of a single notch 49 as shown. The notch 49 and nose 48 of the fans 40 can have the same dimensions as recited above with respect to FIG. 15A. Optionally, the fans 40 of FIG. 16 can be used with the notched fans of FIGS. 15A and 15B to provide stacked arrangements of different fans in any order.

In yet another embodiment, FIG. 17 shows a series of fans 40 stacked on a central rod 44 in a reactor tube 42. The fans 40 have a single nose 50 positioned at the bottom portion of each fan 40. The remaining portion of the outer diameter face of the fans 40 separate from the nose 50 is recessed to for a notch 51 that defines a radial gap around the perimeter of each fan 40. Attached to the bottom surface of each fan 40 is a washer 52. The washer 52 is recessed so it does not contact the reactor tube 42 whereas the nose 50 is in contact with the reactor tube 42 and directs fluid flow through the reactor. The washer 52, like the washers 41 of FIGS. 15-16, creates vertical gap 54 between the fans 40 that is equal to the height of the washer, which can be in the range of 0.1 to 5 mm. As shown, the washer 52 is a flat ring, however a corrugated washer can be used and, alternatively, the washer 52 can be attached to the top surface of each fan 40. The washer 52 can also be loosely positioned between the fans 40 if not attached to a fan before assembly.

As arranged, the bottom nose 50 of each fan 40 has a washer 52 attached thereto wherein nose 50 of one fan defines the upper boundary of a notch 51 and the nose 50 of the fan 40 below defines the lower boundary of a notch 51. The notch 51 and nose 50 of the fans 40 can have the same dimensions as recited above with respect to FIG. 15A. Optionally, the fans 40 of FIG. 17 can be used with the notched fans of FIGS. 15A, 14b and 15 to provide stacked arrangements of different fans in any order, with or without washers.

Figure 18:
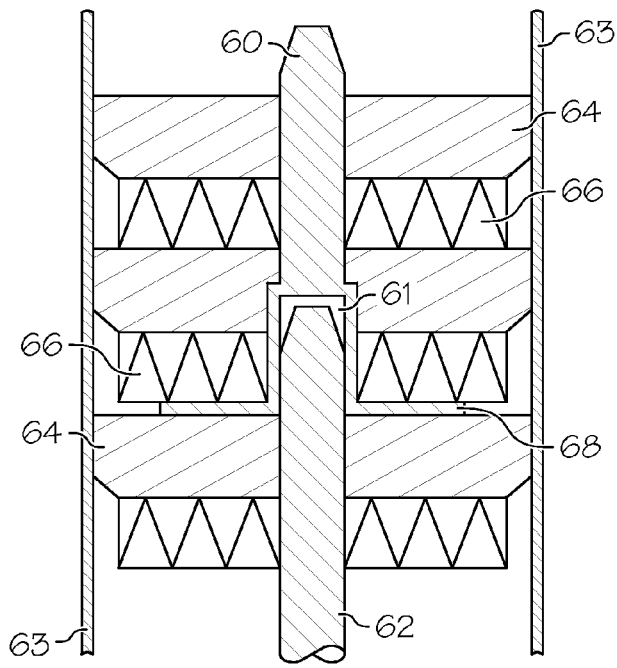
FIG. 18 shows a side view of a loaded reactor sleeve of alternating fans and cores arranged vertically on central rods, one central rod having a cavity portion adapted for fitting with another central rod directly below.
Figure 19:
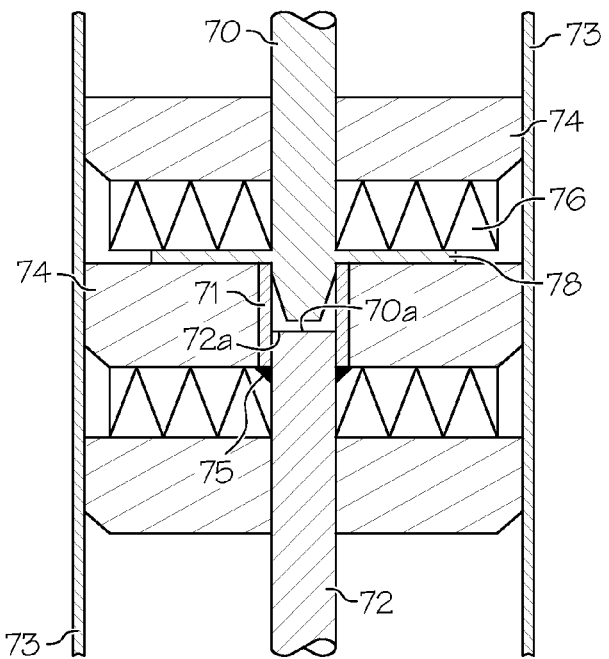
FIG. 19 shows a side view of a loaded reactor sleeve of alternating fans and cores arranged vertically on a central rod support and bushing assembly adapted for fitting with another central rod directly below.

Various embodiments relating to the central rod and bushing configurations and components, as shown in FIGS. 18-19, will now be described. FIG. 18 shows two central rods 60, 62 aligned in a vertical stacking arrangement for purposes of supporting cores 64 and fans 66 stacked in alternating order within a reactor tube 63. Central rod 60 has a cylindrical cavity 61 in its bottom portion for accommodating another central rod, such as 62, which fits inside of the cavity 61 as shown. The cylindrical cavity 61 can have an inner diameter less than, the same or slightly greater than the outer diameter of another central rod, 62, for fitting purposes. For example, the cylindrical cavity 61 can have a diameter of at least 5, 10, 25, 50, 75, 100, 125 or 150 mm and preferably in the range of 6 to 40 mm. The inner diameter of the cavity 61 can be adjusted to permit a gap or clearance between the top of rod 62 and the bottom face of the cavity. The clearance can be at least 2, 4, 8, 10, 15, 20, 30 or 35 mm and preferably in the range of 5 to 20 mm. The height of the cylindrical cavity 61 can be adjusted as desired, for example, the height can be at least 100, 200, 300, 400 or 500 mm.

Extending radially outward from central rod 60 is a base plate 68 for supporting reactor components 64, 66 in the reactor tube 63. The base plate 68 can be attached to the central rod 60, for example by welding, or be an integral portion of the rod 60. The base plate 68 can be located at the bottom end of the central rod 60 as shown or, alternatively, the plate 68 can be positioned above the bottom end anywhere along the length of the rod 60 as desired. The base plate 68 can be have solid bottom and top faces for contacting reactor components or, alternatively, the plate 68 can be perforated for allowing fluid to flow through the plate. The base plate 68 can have any diameter as desired that is greater than the diameter of the cavity 61 but less than the inner diameter of the reactor tube 63. In operation, a series of rods can be utilized, all having the same structural features, such as a bottom cylindrical cavity, such that one or more rods are aligned and fit together for arranging cores and fans in a reactor tube. Stacking rods vertically with protruding portions of one rod inserted into the cavity of another rod eliminates or prevents excessive gaps between reactor components. Disassembly of the reactor components can be accomplished by pulling the central rods out of the reactor tube, for example engaging the top of a central rod and pulling upward. The base plate of each central rod prevents the reactor components from slipping off the central rod during assembly and disassembly of the reactor.

FIG. 19 shows a central rod 70 vertically aligned above another central rod 72 in a reactor tube 73. Central rod 70 has a base plate 78 located above the bottom end of the rod 70a for supporting a fan 76 and core 74 stacked vertically on the rod. The base plate 78 can be positioned at any location along the length of the rod 70 as desired, and preferably the base plate 78 can be at least 5, 10, 15, 20, 25, 30, 35 or 40 mm above the bottom 70a. Similar to the base plate of FIG. 18, base plate 78 can be solid or perforated.

As shown, the bottom 70a of central rod 70 is spaced apart from the top 72a of central rod 72 within a bushing 71 that circumferentially surrounds a portion of both central rods. The spacing can be the same as the clearance described above with regard to FIG. 18. The bushing 71 can have a diameter of at least 10, 12, 14, 16, 18, 20, 22, 24 or 26 mm and a height of at least 10, 20, 30, 40 or 50 mm. The bushing 71 can be attached to the bottom portion of central rod 70 or to the top of central rod 72 as desired. Alternatively, the bushing 71 can be an integral part of a reactor component, for example the bushing can be attached to the center aperture of a core 74 or fan 76. As shown, the bushing 71 is positioned at the center of a core 74 located at the top of a reactor string aligned on central rod 72. Positioned at the center of a core 74, the bushing 71 can be an integral portion of the core 74 structure such that bushing and core assembly slides onto central rod 72. Barbs 75 can be used directly below the bottom edge of the bushing 71 to hold it in place and prevent the bushing from sliding down the central rod 72. The tapered bottom of central rod 70 can be inserted into bushing 71 to create a stack of loaded reactor sleeves.

Figure 20:
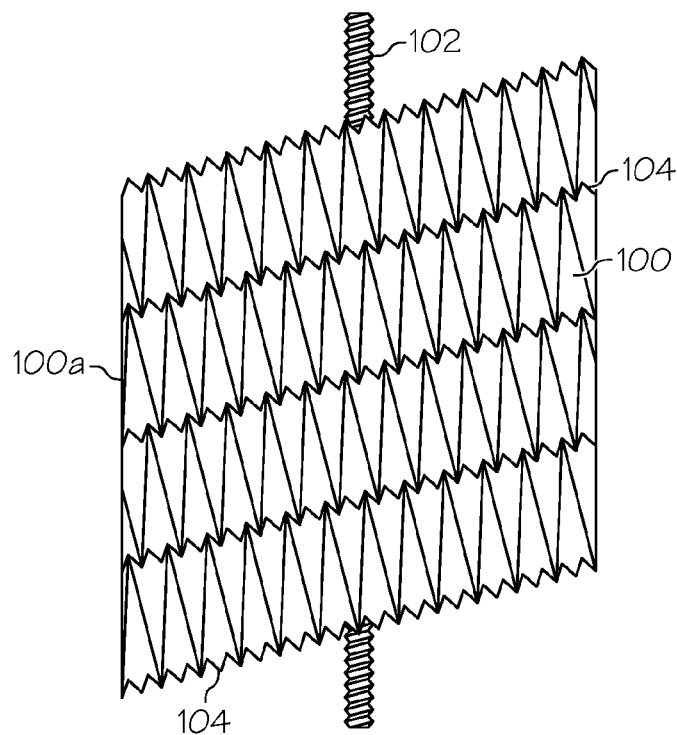
FIG. 20 shows a side view of a helix fan arranged on a central rod for use in a reactor tube.

As described above, multiple reactor components can be stacked on rods for loading reactor sleeves that can be further vertically aligned in a reactor. Various embodiments relating to a single reactor component for use in a reactor tube, as shown in FIGS. 20 and 20, will now be described. A spiral wound or helix reactor component, such as a fan or finned foil, can reduce the use of multiple, stacked reactor components, for example, a helix fan can be the sole reactor component positioned on a central rod for use in a reactor tube. Optionally, one or more helix fans or finned foils can be stacked together or a double helix assembly of a fan and core or finned foil and core can be used. FIG. 20 shows a helix fan 100 fitted on a central rod 102 for use in a reactor tube. The helix fan 100 can be formed by corrugating a strip of flat or rippled metal foil to create substantially triangular corrugations for use as fluid flow ducts. The corrugated strip of foil can be fanned out to create a ring wherein the corrugated strip is further fanned out in a spiral manner to obtain a helix structure as shown. The helix can be twisted in either direction, clockwise or counterclockwise. The inner diameter of the helix can be optionally attached to a support tube to provide structural strength to the helix structure and for accommodating a central rod for mounting purposes. Preferably, the helix structure has a constant outer diameter along its entire length. The outer diameter face of the helix fan 100 can be spaced away from the inner wall of the reactor tube, for example the spacing can be at least 1, 2, 3, 5, 10 or 15, mm and preferably in the range of 1 to 8 mm. The outer diameter face of the helix fan 100 can also have notches or be castellated wherein the outermost diameter portions of the face, nose portions, are in contact with the inner wall surface of the reactor tube. The helix fan 100 has an outer diameter face that defines triangular fluid duct faces as described above for receiving and directing fluid flow through the reactor.

The metal strip of foil used to form the helix fan can have notches or cutouts on one edge for arranging structural notches or noses along the outer diameter face 100a of the helix fan 100. For example, the outer diameter face 100a of the helix fan 100 can have notch and gap arrangements as shown in FIGS. 8 and 15-17. Depending on the arrangement of notches and/or gaps in the outer diameter face of the helix fan 100, the entire face or a portion thereof may be in contact with the inner wall surface of the reactor tube. As described below, washers or spacers can be used to contact the reactor tube and prevent the helix fan 100 from contacting the tube.

The helix fan 100 can have an outer diameter of at least 25, 50, 75, 100, 125, 150, 175, 200, 225 or 250 mm and preferably in the range of 80 to 140 mm. As used as a single reactor component, the helix fan 100 can have a length of at least 0.6, 1, 2, 4, 6, 8, 10 or 15 m and preferably in the range of 0.6 to 2 m or 6 to 12 m. The helix fan can be formed with a twist or incline angle of at least 5, 10, 15, 20, 25, 30, 35 or 40 degrees and preferably in the range of 5 to 40 degrees, and more preferably in the range of 10 to 35 degrees.

Depending on the length of the helix fan 100 and twist or incline angle, any number of spirals can be used. A single spiral can be measured as a portion of the helix that completes one complete circumference. The helix fan 100 can have at least 24, 48, 72, 96, 150, 200, 250, 300, 350 or 400 spirals and preferably in the range of 24 to 96 spirals. The helix fan 100 can be coated with a catalyst as desired and preferably the entire surface of the helix fan is coated.

The helix fan 100 can optionally have a helix washer 104 that can be flat, corrugated or castellated. Due to the flexibility provided by corrugations, a corrugated helix washer is preferred. In addition, the corrugations and/or peaks and valleys of the helix washer 104 can align with the corrugations of the helix fan 100. Flexibility of the helix washer 104 is desirable for forming a continuous arc during installation of the helix fan 100. The helix washer 104 can be attached to the top and/or bottom surface of the helix fan 100 and preferable the helix washer 104 extends along the entire length of the helix fan 100. In a similar arrangement as the washers described above, the helix washer 104 is a ring that is preferably located at the outer circumference edge of the helix fan 100. The helix washer 104 can extend inward or outward from the outer diameter face 100a of the helix fan, or be flush therewith. The helix washer 104, if extending outward from the outer diameter face 100a of the helix fan 100, is preferably not in contact with the inner wall surface of a reactor tube wherein a gap is left between the outer diameter of the helix washer 104 and the reactor tube. The gap created by the helix washer 104 can be the same as described above, for example in FIGS. 5-7. Likewise, the inner diameter, outer diameter and ring width dimensions of the helix washer 104 can be the same as recited above, for example in FIGS. 5-7. In another aspect, the helix washer can be castellated and/or have spacers or spacing tabs as described and shown in FIGS. 8-14.

In another embodiment, the helix fan 100 can be layered with other reactor components, such as a core, to create a double helix reactor component. For example, a core can be spiral wound or fanned out with the corrugated foil used to make the helix fan 100 to create a double helix that contains alternating layers, as viewed from the side, of fans and cores. Optionally, a double helix arrangement can have one or more helix washers for creating gaps between the outer diameter of the washer and the inner was surface of the reactor tube. The outer diameter faces of the fan and/or core are preferably spaced away from the inner wall of the reactor tube as similarly discussed with regard to the helix fan 100.

Figure 21:
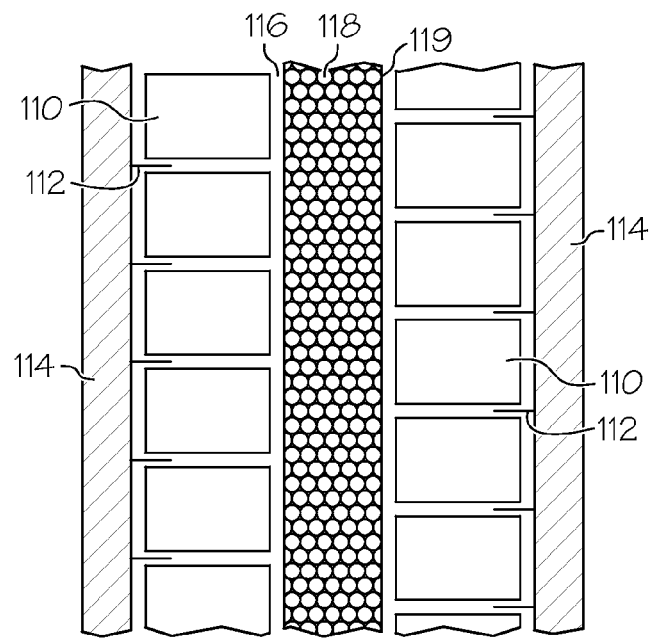
FIG. 21 shows a cross-section view of a helix fan arranged on a central rod for use in a reactor tube.

FIG. 21 shows a cross sectional view of the helix fan arrangement in a reactor tube. Because the helix fan 110 has inner diameter associated with the center aperture of the fan 110, a void space 116 is created. The center void 116 of the helix fan 110 can be filled with loose aggregate of particles 118. The particles 118 can be made of ceramic, metal or combinations thereof as known in the art. The particles 118 are preferably spherical or spheroidal or substantially spheroidal or roughly or somewhat spheroidal or roundish or misshapen spheroids or elliptical, oval or nonuniform or shaped bodies like pellets, granules, gravel, pebbles or stones, such as pebbles found on beaches or in stream-beds. The particles 118 can also be cylindrical or other shapes.

The particles 118 can function to maintain a minimal inner diameter of the helix fan 110 and thus secure the outer diameter face of the helix fan 110 or helix washer 112 against the inner wall of the reactor tube 114. Maintaining contact with the inner wall surface of the reactor tube 114 with a packed center space 116 prevents significant fluid from being concentrated through the center of the helix fan 110. Prior to filing the void space 116 of the helix fan 110, a seal tube 119 can be inserted to serve as a barrier between the inner diameter face of the helix fan 110 and the loose aggregate. The seal tube 119 can be attached or unattached to the helix fan 110 and preferably the seal tube 119 has a height equal to that of the helix fan 110. The seal tube can be in direct contact with the inner diameter face of the helix fan 110 or spaced away from the inner face as desired.

The single helix reactor component shown in FIGS. 20 and 21 provide distinct advantages over reactor arrangements having multiple components. For example, only a single component necessitates coating, which saves production time and cost. Moreover, using a single reactor component, a fixed outer diameter is maintained which results in more consistent flow as compared to multiple reactor components of varying diameters.

While various embodiments in accordance with the present invention have been shown and described, it is understood the invention is not limited thereto, and is susceptible to numerous changes and modifications as known to those skilled in the art. Therefore, this invention is not limited to the details shown and described herein, and includes all such changes and modification as encompassed by the scope of the appended claims.

What is claimed is:

1. A reactor comprising:
a stationary fan arranged on a central rod in a reactor tube, the fan having radial fluid ducts for directing fluid flow through the reactor, the fluid ducts being effective to radially guide the fluid flow to contact the reactor tube and promote heat transfer along the reactor tube;
the fan having a top surface, a bottom surface and an outer diameter face such that the radial fluid ducts terminate along the outer diameter face of the fan to form fluid duct openings facing the reactor tube.

2. The reactor of claim 1, further comprising a core arranged on the central rod.

3. The reactor of claim 1, wherein the fan being a corrugated disk having a center aperture for receiving the central rod.

4. The reactor of claim 1, wherein the fan further having a washer in contact with the top surface or the bottom surface of the fan.

5. The reactor of claim 4, wherein the washer being in the shape of a ring having an inner diameter and an outer diameter, the washer being in contact with the top surface or the bottom surface of the fan wherein the outer diameter of the washer extends radially outward from the outer diameter face of the fan.

6. The reactor of claim 5, wherein the washer being flat or corrugated.

7. The reactor of claim 5, wherein the washer further having spacing tabs extending outward from the outer diameter of the washer.

8. The reactor of claim 5, wherein the washer being in contact with the reactor tube.

9. The reactor of claim 8, wherein the outer diameter face of the fan being not in contact with the reactor tube wherein the washer creates a gap between the outer diameter face of the fan and the reactor tube of at least 1 mm.

10. The reactor of claim 1, wherein the central rod having a base plate for supporting the fan arranged on the central rod, the base plate extending radially outward from the central rod.

11. The reactor of claim 1, wherein the central rod having a top end and a bottom end, the central rod having a cylindrical cavity at the top end or bottom end for receiving a portion of another central rod.

12. The reactor of claim 1, wherein the fan being a helix fan.

13. The reactor of claim 12, wherein the helix fan having an incline angle in the range of 5 to 40 degrees.

14. The reactor of claim 12, wherein the helix fan further having a helix washer, the helix washer extending outward from the outer diameter face of the helix fan, a portion of the helix washer being in contact with the reactor tube.

15. The reactor of claim 14, wherein the outer diameter face the helix fan being not in contact with the reactor tube wherein the helix washer creates a gap between the outer diameter face of the helix fan and the reactor tube, the gap being at least 1 mm.

16. The reactor of claim 1, wherein the outer diameter face of the fan having a notch extending around the perimeter of the fan.

17. The reactor of claim 16, wherein the notch being an annular channel around the outer diameter face of the fan.

18. The reactor of claim 17, wherein the outer diameter face of the fan further having one or more nose portions, the one of one or more nose portions defining the notch and the one or more nose portions being in contact with the reactor tube.

19. The reactor of claim 17, wherein the fan further having a helix washer in contact with the top surface or the bottom surface.

20. A stackable structural reactor comprising:
 a stationary reactor component arranged in a reactor tube, the reactor component having a top surface, a bottom surface and a circular outer diameter face, the reactor component adapted to radially direct fluid flow through the reactor towards the reactor tube and promote heat transfer along the reactor tube arranged in a reactor tube;
 a washer having an inner diameter and an outer diameter, the washer being in contact with the top surface or the bottom surface of the reactor component, the washer extending radially outward beyond the circular outer diameter face of the reactor component;
 the outer diameter of the washer not being in contact with the reactor tube.

21. The reactor of claim 1, wherein the heat transfer along the reactor tube promotes carrying out catalytic reactions.

22. The reactor of claim 1, wherein the heat transfer along the reactor tube effectively transfers heat from the exterior of the reactor to the fluid contained in the reactor or from the fluid contained in the interior of the reactor to the exterior of the reactor.

23. The reactor of claim 20, wherein the heat transfer along the reactor tube promotes carrying out catalytic reactions.

\* \* \* \* \*